(12) United States Patent
Yachi et al.

(10) Patent No.: US 6,194,817 B1
(45) Date of Patent: *Feb. 27, 2001

(54) TUNING-FORK VIBRATORY GYRO

(75) Inventors: Masanori Yachi; Yoshio Satoh; Hiroshi Ishikawa, all of Kawasaki; Yoshitaka Takahashi; Kazutugu Kikuchi, both of Yokohama, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/715,881

(22) Filed: Sep. 19, 1996

(30) Foreign Application Priority Data

Apr. 2, 1996 (JP) ................................................ 8-080274

(51) Int. Cl.[7] ............................................... H01L 41/08
(52) U.S. Cl. ......................... 310/370; 310/345; 310/351
(58) Field of Search ................................ 310/345, 348, 310/351–353, 370

(56) References Cited

U.S. PATENT DOCUMENTS

| 2,081,405 | * | 5/1937 | Mason | 310/370 X |
| 3,697,766 | * | 10/1972 | Ganter et al. | 310/370 X |
| 3,795,831 | * | 3/1974 | Fujita | 310/370 |
| 3,909,641 | * | 9/1975 | Ohshima et al. | 310/351 |
| 3,969,641 | * | 7/1976 | Oguchi et al. | 310/370 |
| 4,178,526 | * | 12/1979 | Nakamura et al. | 310/351 X |
| 4,328,442 | * | 5/1982 | Tanaka et al. | 310/326 |
| 4,340,835 | * | 7/1982 | Nakamura et al. | 310/326 X |
| 4,382,204 | * | 5/1983 | Yoda | 310/370 X |
| 4,410,827 | * | 10/1983 | Kogure | 310/370 |

FOREIGN PATENT DOCUMENTS

| 0 298 511 A2 | 7/1988 | (EP) . |
| 0070784 | * 6/1978 | (JP) ............................ 310/345 |
| 2-163607 | 6/1990 | (JP) . |
| 2-163608 | 6/1990 | (JP) . |
| 2-163609 | 6/1990 | (JP) . |
| 2-163611 | 6/1990 | (JP) . |

* cited by examiner

*Primary Examiner*—Mark O. Budd
(74) *Attorney, Agent, or Firm*—Armstrong, Westerman, Hattori, McLeland & Naughton

(57) ABSTRACT

A tuning-fork vibration gyro includes a tuning-fork vibrator having two arms and a base portion, and a supporting portion located in a center of a rotational motion of the base portion caused by a vibration resulting from a Coriolis force. The supporting portion protrudes from two surfaces of the base portion opposite each other in a direction in which the vibration resulting from the Coriolis force occurs.

14 Claims, 12 Drawing Sheets fy MODE

STEADY POINT
(CENTER OF ROTATIONAL MOTION)

fx MODE

STEADY CENTER LINE (A)

CENTER OF ROTATIONAL MOTION (B)

FIG. 4
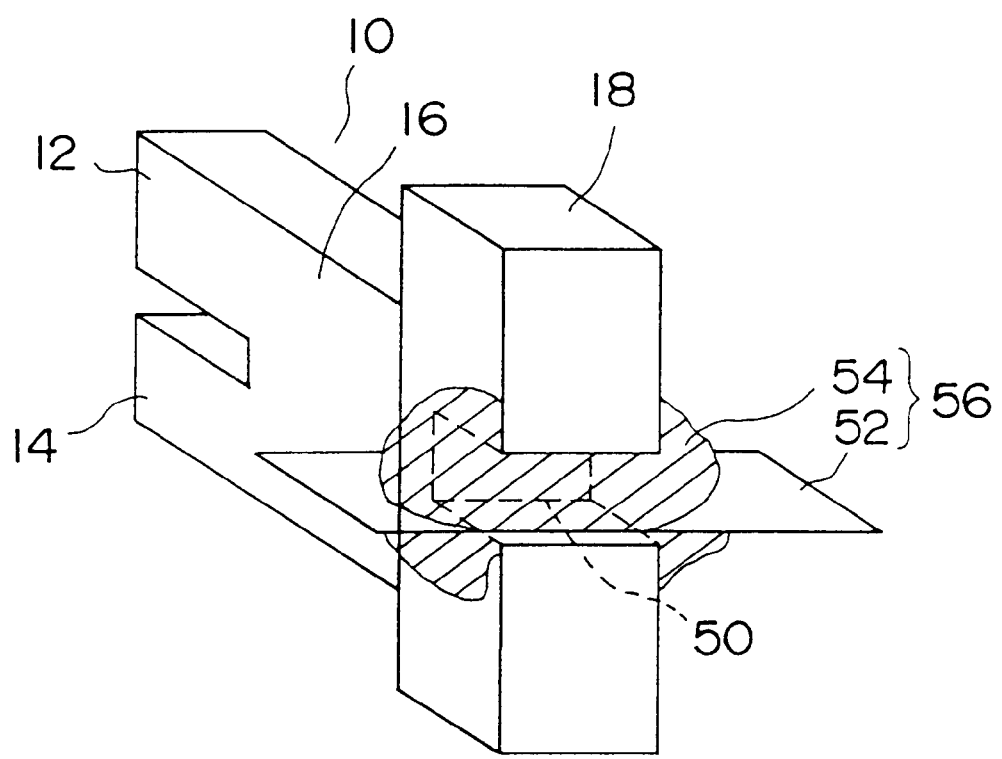
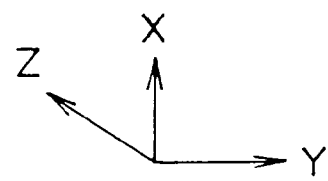

TUNING-FORK VIBRATORY GYRO

BACKGROUND OF THE INVENTION

1. Field of the Invention

The present invention generally relates to tuning-fork type vibratory gyros, and more particularly to a tuning-fork type vibratory gyro having a piezoelectric substance.

A gyroscope has been used to identify the current position of a vehicle such as an airplane, ship or a satellite. Recently, a gyroscope has been applied to devices for personal use, such as car navigation and vibration detection in video cameras and still cameras.

A conventional coma gyro detects an angular velocity by utilizing a principle in which a rotating a coma (disk) continues to rotate without any change of the attitude thereof while keeping the rotation axis even when a device equipped with the coma gyro is tilted. Recently, an optical type gyro and a piezoelectric type gyro has been developed and reduced to practical use. The principles of the piezoelectric type gyro was proposed around 1950. Various piezoelectric type gyros having, for example, a tuning-fork, a cylinder or a semi-spherical member have been proposed. Recently, a vibratory gyro having a piezoelectric member has been in practical use. Such a vibratory gyro has less measurement sensitivity and precision than those of the coma gyro and the optical gyro, but has advantages in terms of size, weight and cost.

2. Description of the Related Art

A description will now be given, with reference to FIGS. 1A and 1B, of a vibration of a tuning-fork vibrator.

A tuning-fork vibrator (hereinafter simply referred to as a tuning fork) 1 includes two arms 2 and 3, and a base 4 supporting the arms 2 and 3. Each of the arms 2 and 3 has a rectangularly shaped cross section. The tuning fork 1 has two different modes of vibrations, one of which is a plane-vertical vibration (FIG. 1A) and the other vibration is an in-plane vibration (FIG. 1B). Hereinafter, the plane-vertical vibration is referred to as an fy-mode vibration, and the in-plane vibration is referred to as an fx-mode vibration.

The fx-mode vibration and the fy-mode vibration are different vibration modes. As shown in FIG. 1A, the fy-mode vibration includes torsional vibrations (indicated by arrows depicted with broken lines), and hence has a steady point, indicated by a "x", which is located on the bottom surface of the base 4. This means that it is very difficult to support the tuning fork. The fx-mode vibration shown in FIG. 1B has a steady line (not point), which corresponds to the center line on the bottom surface of the base 4. Hence, it is possible to reduce the movement of the bottom surface of the base 4 to approximately zero by adjusting the length L of the base 4.

Generally, the fx-mode vibration is driven, while the fy-mode vibration is detected, so that an electric output signal due to Coriolis force can be obtained.

More particularly, as shown in FIGS. 2A and 2B, a holder 5 is elastically attached to the base 4 of the tuning fork 1. The fy-mode vibration gives torsional stresses to the holder 5 as shown by broken-line arrows in FIG. 2A, while the fx-mode vibration gives compressive stresses to the holder 5. By selecting an appropriate length L of the base 4 with respect to the total length of the tuning fork 1, it is possible to suppress most of the fx-mode vibrations around the base 4 and to substantially neglect the influence of the holder 5. Hereinafter, the combination of the base 4 and the holder 5 is referred to as a base portion.

On the other hand, a torsional displacement of the fy-mode vibration is very much greater than a longitudinal displacement of the fx-mode vibration. In the fy-mode vibration, a rotational motion (torsional displacement) about the center (the yz plane in the center of the holder 5) of the rotational motion in the holder 5 occurs, as shown in FIG. 2A. That is, in the fy-mode vibration, the tuning fork 1 and the supporting member vibrate integrally. Hence, it is possible to change the resonance frequency and/or the mechanical Q by changing the shape, material and weight of the holder 5 and to thus obtain the frequency band of the desired fy-mode vibration.

For example, if the weight of the holder 5 is changed by attaching a weight to the holder 5, the rotational motion of the holder 5 is suppressed. When the rotational motion of the holder 5 is suppressed, the detection frequency is decreased. If a weight of the holder 5 is added to the base 4, a similar effect will be obtained.

With the above in mind, the gyro shown in FIGS. 2A and 2B is supported by a board 6 such as a printed-circuit board, as shown in FIG. 3, which shows the gyro viewed from the bottom of the holder 5. More particularly, the arms 1 and 2 extend in the z-axis direction. A pin 8 penetrates through the center of the holder 5. The pin 8 is attached to the board 6 and is fixed thereto by a resilient member such as a resilient or elastic adhesive. In the structure shown in FIG. 3, the fx-mode vibration occurs in parallel with the plane of the board 6, while the fy-mode vibration occurs in a plane perpendicular to that of the board 6. Since the holder 5 is supported in the center thereof, the rotational motion of the holder 5 is not suppressed. Hence, it is easily possible to adjust the detection frequency by adding a weight to the holder 5 or the base 4.

However, the attachment structure shown in FIG. 3 has a disadvantage in that it is liable to be affected by an external vibration. If an external vibration is applied to the structure, the gyro will be swung about the attached position of the pin 8 in directions indicated by the two-headed arrow shown in FIG. 3. For example, a rotational motion different from that shown in FIG. 2A will be caused in the base portion by the external vibration, so that noise (particularly called cross-talk noise) will develop across the detection electrodes. Although unnecessary motions (which will occur in the x-, y- and z-axis directions) other than the motion shown in FIG. 3 will be caused, these motions will not greatly cause noise. That is, the unnecessary motion shown in FIG. 3 causes substantial noise. The cross-talk noise mainly caused by the unnecessary motion shown in FIG. 3 causes a detection error if the gyro shown in FIG. 3 is used in an environment in which a vibration always occurs, for example, if the gyro is mounted on a vehicle. The presence of such a detection error degrades the precision of detecting the angular velocity.

If the whole base portion is rigidly fixed to the board 6, the occurrence of a swinging motion of the gyro will be prevented. However, in this case, the base portion cannot be moved and it is no longer possible to perform the frequency adjustment by adding a weight to the base portion.

SUMMARY OF THE INVENTION

It is a general object of the present invention to provide a tuning-fork vibration gyro in which the above disadvantages are eliminated.

A more specific object of the present invention is to provide a tuning-fork vibration gyro in which cross-talk noise due to an external vibration can be suppressed and a frequency can be adjusted by adjusting a parameter regarding a base portion of the gyro.

The above objects of the present invention are achieved by a tuning-fork vibration gyro comprising: a tuning-fork vibrator having two arms and a base portion; and a supporting portion located in a center of a rotational motion of the base portion caused by a vibration resulting from a Coriolis force, the supporting portion protruding from two surfaces of the base portion opposite to each other in a direction in which the vibration resulting from the Coriolis force occurs.

In the above tuning-fork vibration gyro, the supporting portion may include a resilient material.

The base portion may comprise a slit located therein which is in the center of the rotational motion; and the supporting portion comprises a supporting plate inserted into the slit, and an adhesive by which the supporting plate is attached to the base portion.

The base portion may comprise a through hole located therein which is in the center of the rotational motion; and the supporting portion comprises a supporting rod inserted into the through hole, and an adhesive by which the supporting rod is attached to the base portion.

The base portion may comprise a plurality of through holes located in the base portion at the center of the rotational motion of the base portion; and the supporting portion comprises a plurality of rods inserted into the plurality of through holes, and an adhesive by which the plurality of supporting rods are attached to the base portion.

The above plurality of through holes may be arranged in a line in the center of the rotational motion of the base portion.

The supporting portion may comprise: a plurality of supporting plates attached to two surfaces of the base portion; and an adhesive by which the plurality of supporting plates are attached to the two surfaces of the base portion.

The supporting portion may comprise supporting members that are provided on the two surfaces of the base portion and support the plurality of supporting plates.

The supporting portion may comprise: a plurality of supporting rods located in the center of the rotational motion of the base portion; and an adhesive by which the plurality of supporting rods are attached to the base portion.

At least two of the plurality of supporting rods may be provided on each of the two surfaces of the base portion.

At least two of the plurality of supporting rods may be arranged in a line in the center of the rotational motion of the base portion.

The base portion may comprise a base integrally formed with the two arms, and a holder attached to the base, the supporting portion being provided to the base.

The adhesive may comprise a resilient adhesive.

BRIEF DESCRIPTION OF THE DRAWINGS

Other objects, features and advantages of the present invention will become more apparent from the following detailed description when read in conjunction with the accompanying drawings, in which:

FIG. 4 is a perspective view of a tuning-fork vibration gyro according to a first embodiment of the present invention;

DETAILED DESCRIPTION OF THE PREFERRED EMBODIMENTS

Figure 1A:
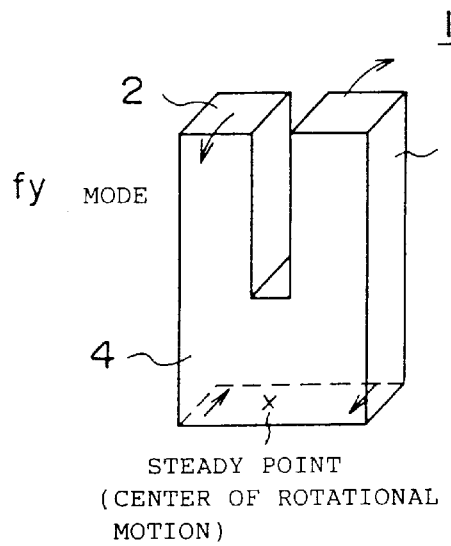
FIGS. 1A and 1B are perspective views illustrating vibrations of a tuning-fork vibrator.
Figure 1B:
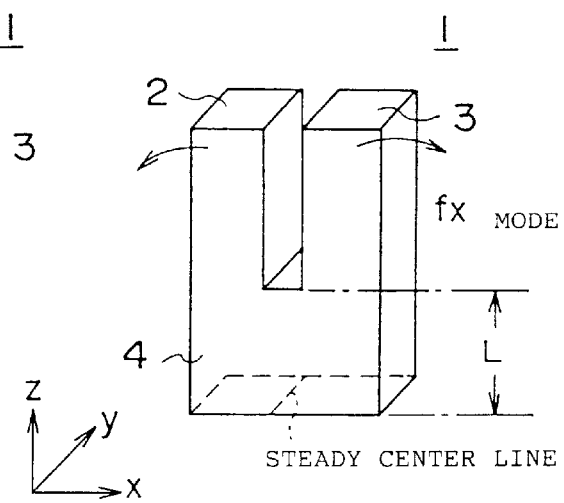
Figure 2A:
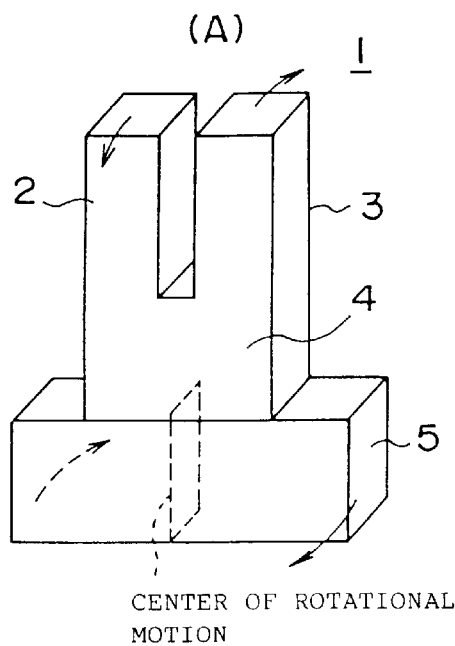
FIGS. 2A and 2B are perspective views illustrating vibrations of the tuning-fork vibrator with a supporting member being attached thereto.
Figure 2B:
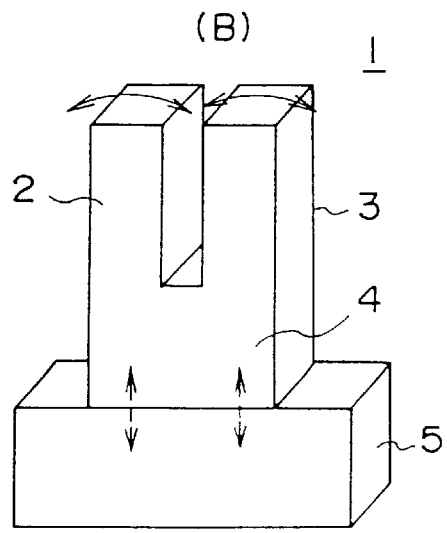

FIG. 4 is a perspective view of a tuning-fork vibration gyro according to a first embodiment of the present invention.

The tuning-fork vibration gyro shown in FIG. 4 includes a tuning-fork vibrator 10, a vibrator holder 18 and a supporting portion 56. The tuning-fork vibrator 10 has two arms 12 and 14, and a base 16. The holder 18 is attached to the bottom surface of the base 16. The supporting portion 56 includes a supporting plate 52 and a resilient adhesive 54. The base 16 and the holder 18 form a base portion of the tuning-fork vibration gyro.

The first embodiment of the present invention has the following features. A slit 50 is formed in the holder 18, as shown in FIG. 4. The supporting plate 52 is inserted into the slit 50 formed in the holder 18, and is attached to the holder 18 by the resilient adhesive 54, which may be silicone or urethane adhesive. The above attachment structure makes it possible to suppress a swing motion of the base portion without decreasing rotational motion of the base portion and thereby suppress occurrence of cross-talk noise due to an external vibration applied to the gyro and to adjust the frequency of the vibration to be detected by adjusting a parameter of the base portion.

The slit 50 includes the center of the rotational motion of the holder 50 (the yz plane located in the center of the holder 50), and extends in the direction (the y-axis direction) perpendicular to the direction (the x-axis direction) in which the driving vibration occurs. In other words, the slit 50 extends in the direction in which the detected vibration (fy-mode vibration) occurs so that it passes through the center of the rotational motion of the holder 50. The supporting plate 52 is provided in the slit 50 formed in the holder 18. The supporting plate 52 has a width approximately equal to or greater than the depth of the slit 50 in the z-axis direction. The width of the slit 50 in the x-axis direction is slightly greater than the thickness of the supporting plate 52. By providing the resilient adhesive 54 in the slit 50 and the peripheral areas thereof, the supporting plate 52 and the holder 18 are flexibly adhered together.

Since the supporting plate 52 is located in the center of the rotational motion, the rotational motion of the base portion caused by the fy-mode vibration of the arms 12 and 14 due to the Coriolis force cannot be prevented. Hence, it is possible to easily adjust the detection frequency by adding a weight to the holder 18 or forming a cutout portion in the holder 18. The supporting plate 52 outwardly protrudes from the two sides of the holder 18 in the y-axis direction. Hence, it is possible to support the supporting plate 52 by using the protruding portions of the supporting plate 52 without suppressing the rotational motion of the base portion. Further, the use of the resilient adhesive 54 does not prevent the rotational motion of the holder 18 and makes it difficult for the external vibration to be applied to the base portion of the gyro.

Figure 5:
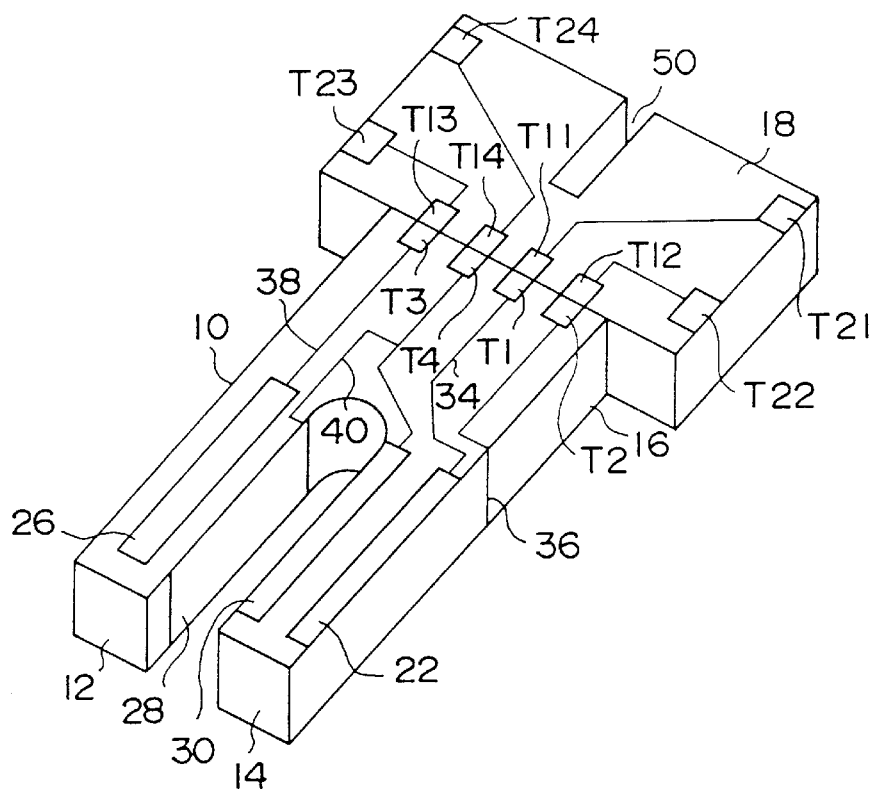
FIG. 5 is a perspective view of details of the gyro according to the first embodiment of the present invention.

A description will now be given, with reference to FIG. 5, of details of the first embodiment of the present invention. More particularly, FIG. 5 is a perspective view of the tuning-fork vibration gyro having the holder 18.

The tuning fork 10 can be made of a piezoelectric bulk such as a piezoelectric single crystal or a piezoelectric member provided on a thin plate. An example of such a piezoelectric single crystal is a 140°±20° rotation y-plate of LiTaO_3, or a 130°±20° rotation y-plate of LiNbO_3. The single crystal has less inner loss than ceramics and provides a tuning fork without hysteresis. A slit which defines the two arms is formed in, for example, a 130° rotation y-plate of LiTaO_3 of a rectangular shape by means of a dicing saw or wire saw. Next, a thin film (for example, NiCr/Au) is formed on all the surfaces of the y-plate, and is then patterned into the aforementioned electrodes by, for example, a light exposure method. At the same time as patterning the thin film, wiring lines are also formed by patterning. The holder 18 can be formed of an alumina plate, epoxy-resin plate or a liquid-crystal polymer plate.

Figure 6:
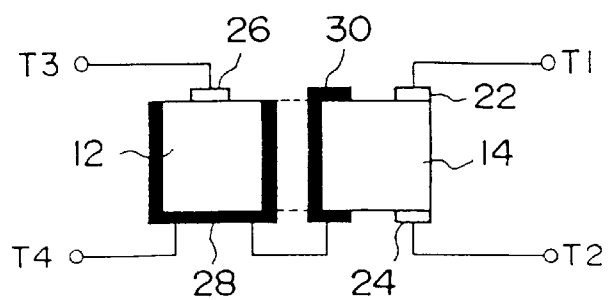
FIG. 6 is a diagram of an arrangement of electrodes of the gyro shown in FIG. 5.

The electrodes formed on the tuning-fork vibrator 10 shown in FIG. 5 will be described by referring to FIG. 6. The fx-mode vibration is driven through the arm 14, and the fy-mode vibration is detected through the arm 12. An electrode 30 functions as a ground electrode, and is electrically connected to an electrode 28 formed on the arm 12. A driving voltage is applied across electrodes 22 and 24 via terminals T1 and T2. The detection electrodes include electrodes 26 and 28. The electrode 28 functions as a ground electrode, and is formed on three side surfaces of the arm 12. The electrode 26 is formed on the remaining side surface of the arm 12. A detection voltage develops across the electrodes 26 and 28 via terminals T3 and T4. An electrode 30 is set to the ground potential via the electrode 28, which covers the three side surfaces of the arm 12. Hence, a good shield effect with respect to the electrodes 22 and 24 can be obtained. It is possible to use the electrode 24 in a floating state with respect to the ground. This is advantageous in circuit design.

Turning now to FIG. 5 again, a wiring line 34 electrically connects the electrode 22 of the arm 14 and the terminal T1 together, and a wiring line 36 electrically connects the electrode 24 (which does not appear in FIG. 5) of the arm 14 and the terminal T2 together. A wiring line 38 electrically connects the electrode 26 of the arm 12 and the terminal T3 together, and a wiring line 40 electrically connects the electrodes 28 and 30 and the terminal T4 together. In order to reduce an influence to the resonation of the vibrator as much as possible, it is preferable to symmetrically form the pattern of the electrodes and wiring lines. For the same reason as described above, it is preferable to symmetrically form the pattern on the holder 18. In the structure shown in FIG. 5, provided are terminals T11–T14, terminals T21–T24 for external connections, and wiring lines electrically connecting these terminals together. The terminals T11–T14 and the terminals T1–T4 can be electrically connected together by an electrically conductive adhesive.

The holder 18 has a rectangular shape and a thickness approximately equal to that of the tuning-fork vibrator 10. This is because the holder 18 is made to vibrate together with the vibrator 10 in the fy mode. Further, when the thickness of the holder 18 is approximately equal to that of the vibrator 10, it is possible to easily establish the mutual position of the base 16 and the holder 18 and the electrodes thereof. The holder 18 is not limited to a rectangular shape, but may have another shape.

As has described previously, the slit 50 is formed so that it includes the center of the rotational motion of the holder 18 and connects the opposite surfaces of the holder 18 together. The width of the slit 50 is greater than the thickness of the supporting plate 52.

Figure 7:
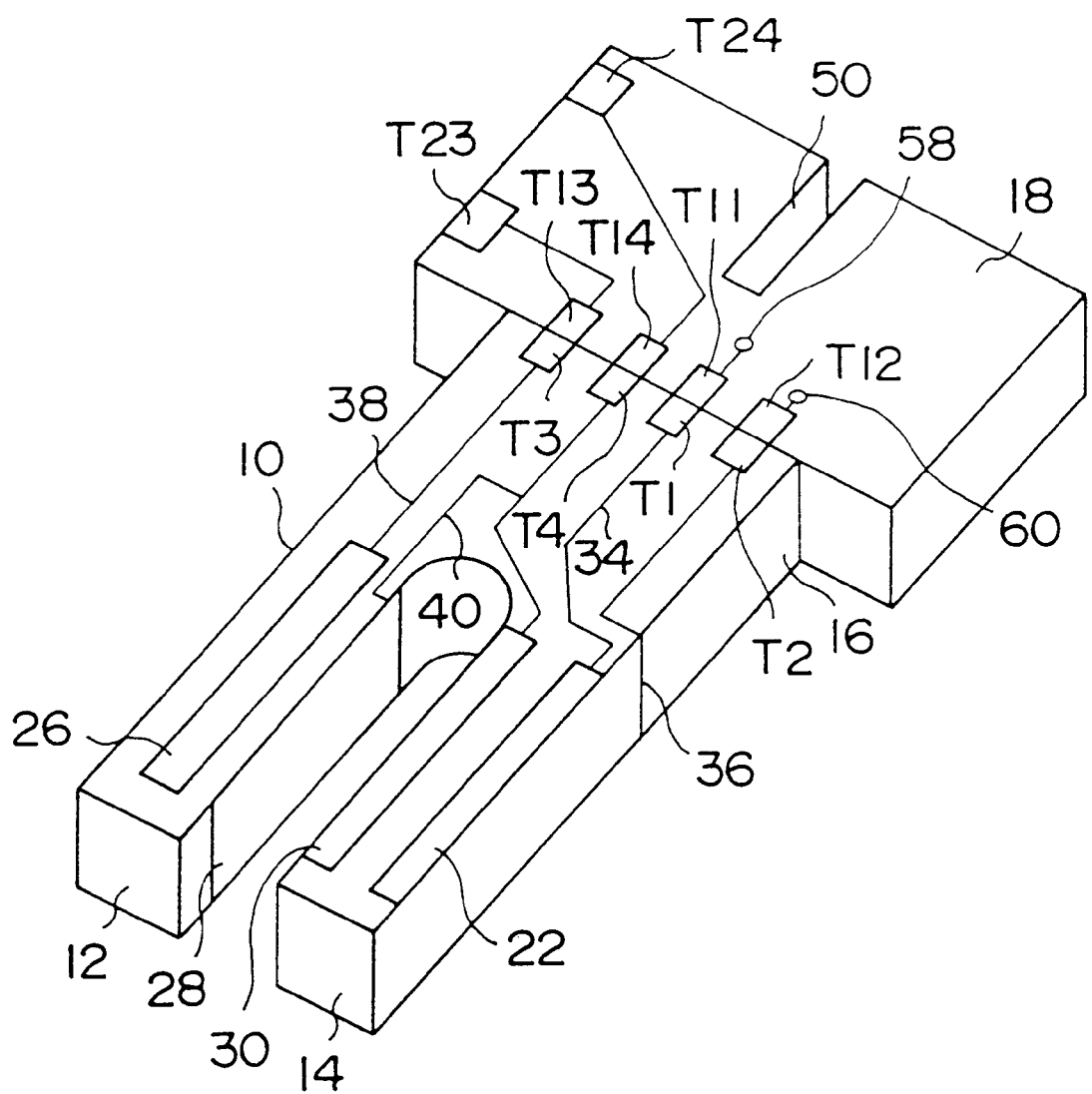
FIG. 7 is a perspective view of a variation of the gyro shown in FIG. 5.

FIG. 7 is a perspective view of a variation of the tuning-fork vibrator shown in FIG. 5. In FIG. 7, parts that are the same as those shown in FIG. 5 are given the same reference numbers. The structure shown in FIG. 7 is preferable particularly in an embodiment of the present invention that will be described later. In the structure shown in FIG. 5, the terminals T21–T24 are formed on the same surface of the holder 18. In the structure shown in FIG. 7, the terminals T21 and T22 are provided on the lower surface of the holder 18, and the terminals T23 and T24 are provided on the upper surface thereof. The terminals T21 and T22 are electrically connected to the terminals T11 and T22 through through holes 58 and 60, respectively. An electrically conductive material is provided in the through holes 58 and 60. The terminals T21 and T22 are located so as to be opposite to the terminals T23 and T24.

Figure 8:
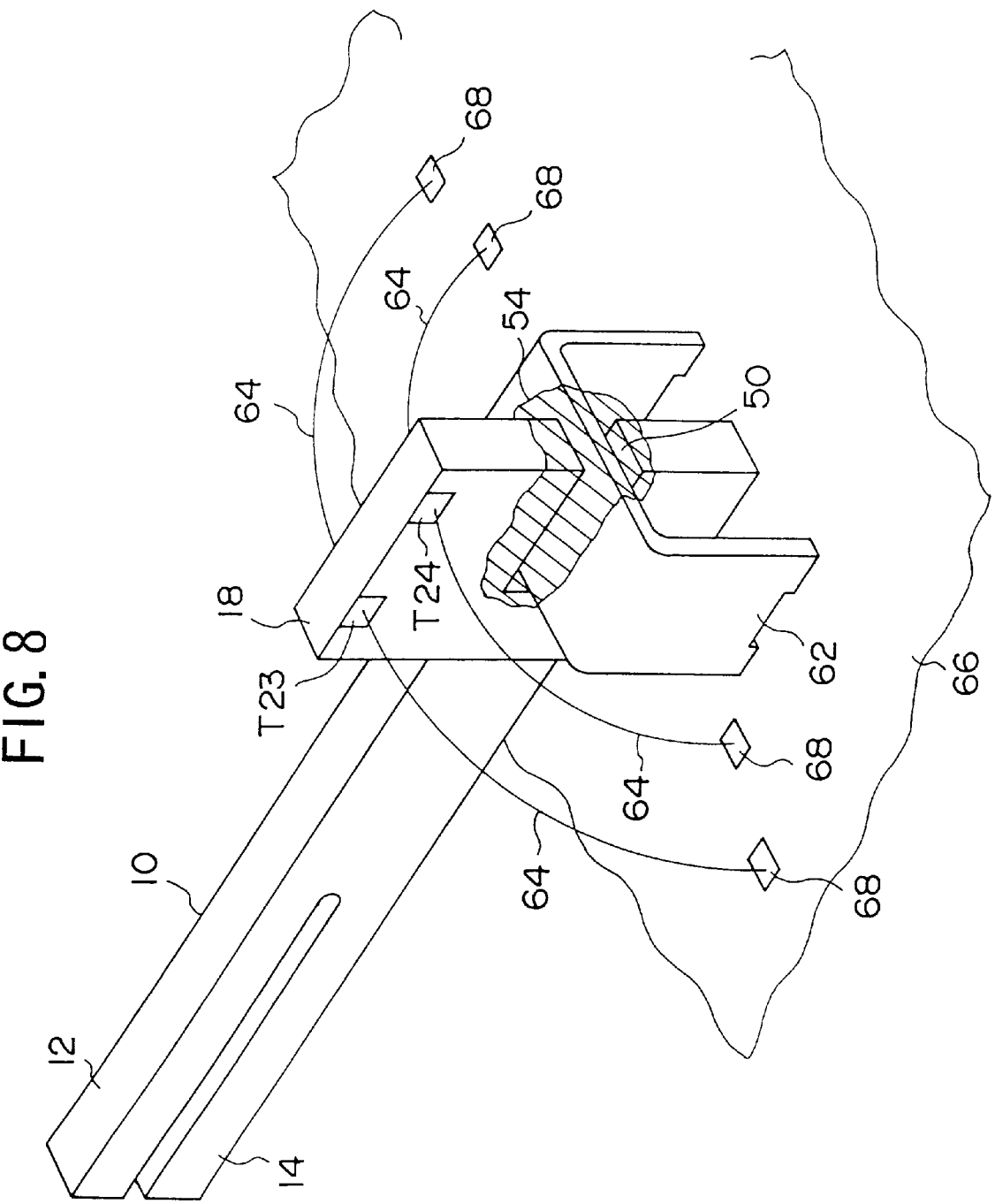
FIG. 8 is a perspective view of the gyro shown in FIG. 7 in which the gyro is mounted on a wiring board.

FIG. 8 is a perspective view of the above-mentioned tuning-fork vibration gyro mounted on a wiring board 66. Since FIG. 8 is directed to illustrating a mounting state of the gyro, the electrodes and wiring patterns shown in FIG. 7 are omitted for convenience sake. A supporting plate 62 has an approximately U-shaped cross section, and projections provided at end portions of the supporting plate 62. The projections of the supporting plate 62 are inserted into holes formed in the wiring board 66. A horizontal portion of the supporting plate 62 is inserted into the slit 50 of the holder 18, and is flexibly attached to the holder 18 by the resilient adhesive 54. The terminals T21–T24 (T21 and T22 do not appear in FIG. 8) of the holder 18 are electrically connected to terminals 68 formed on the wiring board 66 by electrically conductive wires 64 which may be soft wires. The lower side end of the holder 18 is spaced apart from the surface of the wiring board 66 so that the rotational motion of the holder 18 cannot be prevented.

The supporting plate 62 can be made of a rigid material such as iron or a resilient material such as a polyethylene printed-circuit board or a plate of phenolic polymer material. This holds true for the aforementioned supporting plate 52.

Figure 3:
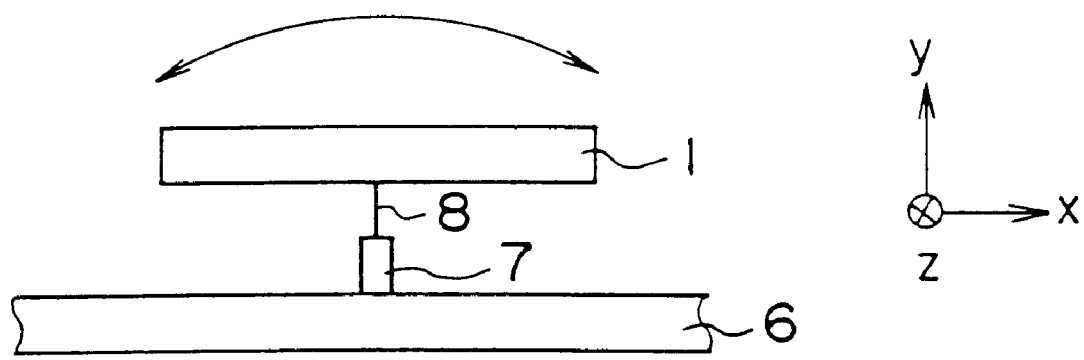
FIG. 3 is a diagram showing a conventional gyro mounting manner and a disadvantage thereof.
Figure 9:
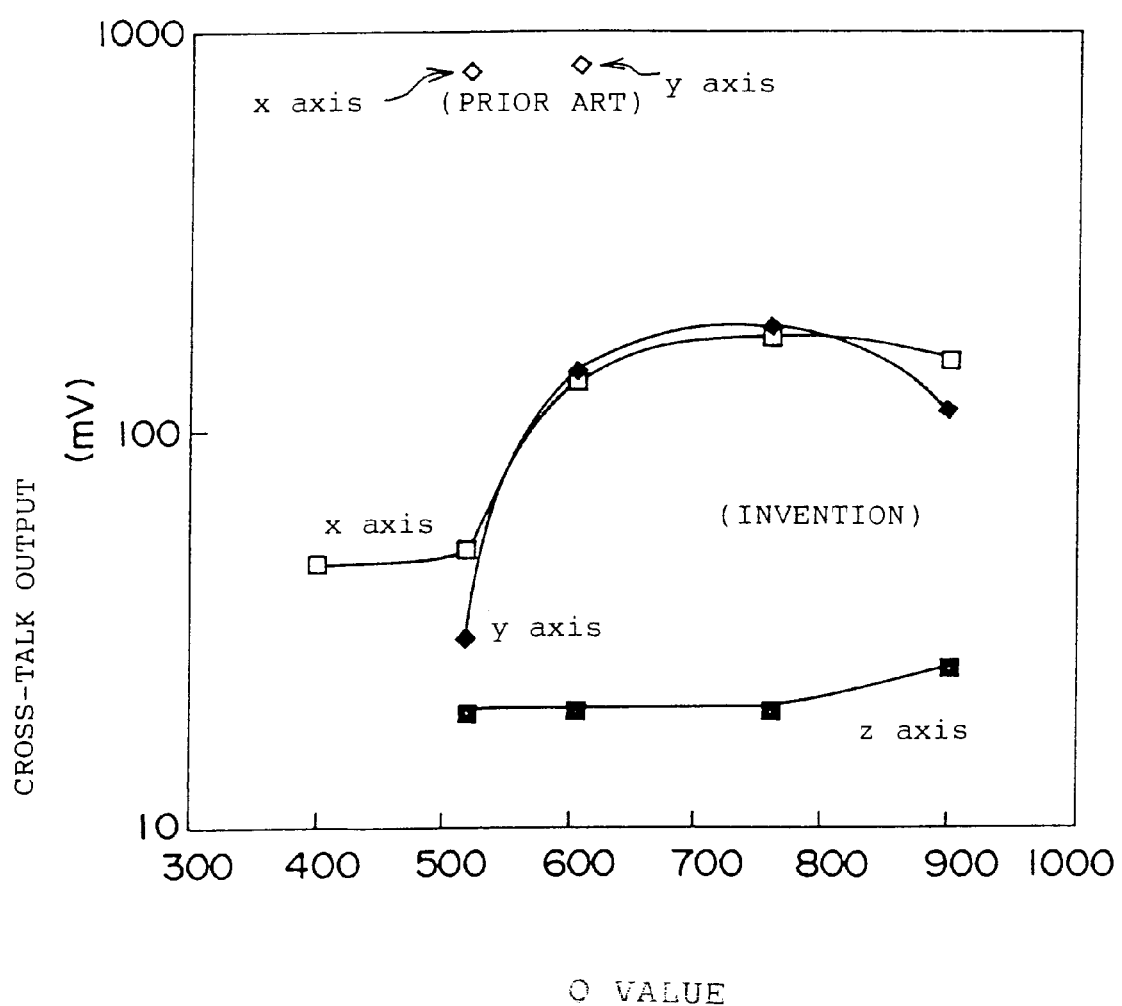
FIG. 9 is a graph of a variation in the cross-talk output as a function of the Q value in the first embodiment of the present invention and the conventional structure shown in FIG. 3.

FIG. 9 is a graph showing relations between the Q value and cross-talk output in the structures shown in FIGS. 3 and 8. The horizontal axis of the graph denotes the Q value which is inversely proportional to the amount of the resilient adhesive 54, and the vertical axis thereof denotes the cross-talk output (mV). It can be seen from the graph of FIG. 9 that the structure shown in FIG. 8 has a much smaller amount of cross-talk output than the structure shown in FIG. 3. When the Q value exceeds a certain value (in other words, the amount of the resilient adhesive 54 becomes smaller than a certain amount, there is no great variation in the cross-talk output.

Figure 10:
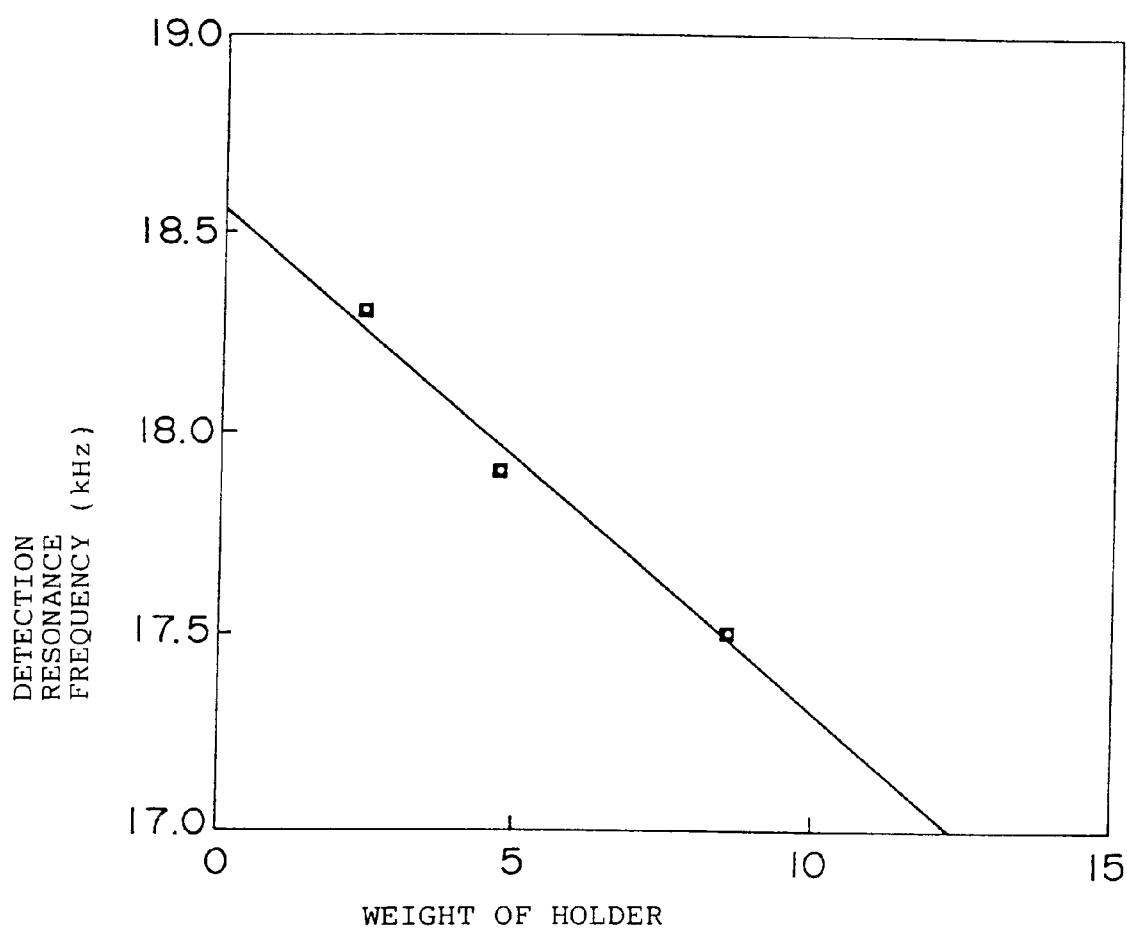
FIG. 10 is a graph of a variation in a detection resonance frequency as a function of the weight of a holder used in the first embodiment of the present invention.

FIG. 10 is a graph of a variation in the detection resonance frequency as a function of the weight of the holder 18 in the structure shown in FIG. 8. The horizontal axis of the graph denotes the weight of the holder 18, and the vertical axis thereof denotes the detection resonance frequency (kHz). As the weight of the holder 19 is increased, the detection resonance frequency is decreased in substantially inverse proportion to the weight of the holder 19. It can be seen from FIG. 10 that the mounting structure shown in FIG. 8 does not prevent the rotational motion of the base portion (including the base 16 and the holder 18).

Figure 11:
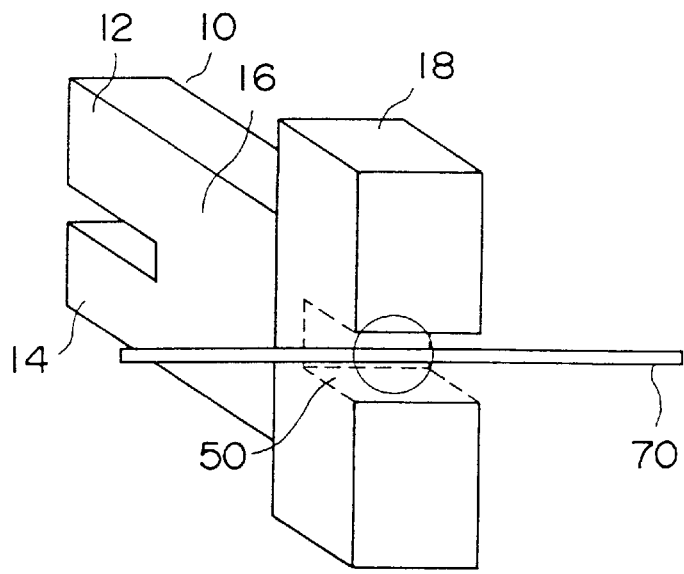
FIG. 11 is a perspective view of a tuning-fork vibration gyro according to a second embodiment of the present invention.

FIG. 11 is a perspective view of a second embodiment of the present invention. In FIG. 11, parts that are the same as those shown in the previously described figures are given the same reference numbers. The structure shown in FIG. 11 is characterized in that a supporting rod 70 is used instead of the supporting plates 52 and 62. The supporting rod 70 is inserted into the slit 50 formed in the holder 18. The resilient adhesive is provided in a portion indicated by a circle including the center of the rotational motion of the holder 18, so that the rod 70 is attached to the holder 18 with a given resilience. When mounting the gyro shown in FIG. 11 on a wiring board or the like, the supporting rod 70 is evenly supported on both sides thereof. Although the supporting rod 70 is straight, the supporting rod 70 may have a bent portion. For example, the supporting rod 70 has a substantially U-shaped cross section and is attached to a wiring board, as shown in FIG. 8. The supporting rod 70 can be made of a rigid material such as iron or a resilient material such as a polyethylene rod or a rod of phenolic polymer material.

Figure 12:
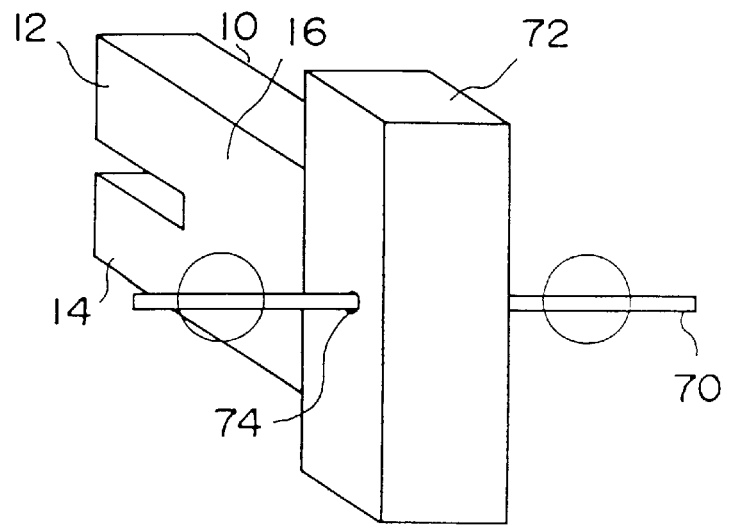
FIG. 12 is a perspective view of a tuning-fork vibration gyro according to a third embodiment of the present invention.

FIG. 12 is a perspective view of a third embodiment of the present invention. In FIG. 12, parts that are the same as those shown in the previously described figures are given the same reference numbers. The structure shown in FIG. 12 is characterized in that a through hole 74, into which the supporting rod 70 is inserted, is formed in a holder 72 instead of the slit 50. The through hole 74 is positioned so as to pass through the center of the rotational motion of the holder 72. A resilient adhesive is provided in the through hole 74 and attaches the supporting rod 70 to the holder 72. When mounting the gyro shown in FIG. 12 on a wiring board or the like, the supporting rod 70 is evenly supported on both sides thereof, for example, in positions indicated by circles. It is possible to use the supporting rod 70 having a substantially U-shaped cross section and mount the gyro on the wiring board as shown in FIG. 8. The third embodiment of the present invention has advantages similar to those of the first embodiment of the present invention.

Figure 13:
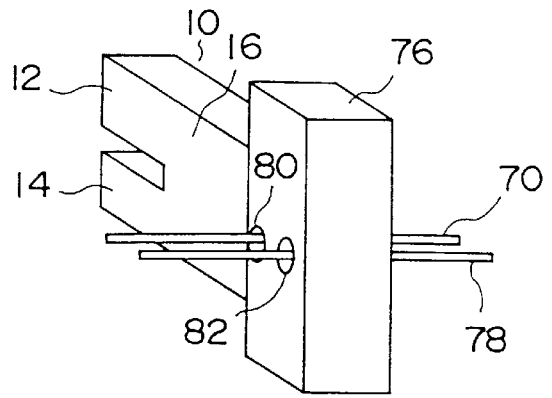
FIG. 13 is a perspective view of a tuning-fork vibration gyro according to a fourth embodiment of the present invention.

FIG. 13 is a perspective view of a fourth embodiment of the present invention. In FIG. 13, parts that are the same as those shown in the previously described figures are given the same reference numbers. The structure shown in FIG. 13 is characterized in that a plurality of supporting rods (two rods 70 and 78 in FIG. 13) are used. Two through holes 80 and 82 are formed in the holder 76 so as to be arranged in a line in the center of the rotational motion of the holder 76. The supporting rods 70 and 78 pass through the through holes 80 and 82, respectively, and are attached to the holder 76 by a resilient adhesive provided in the through holes 80 and 82. The holder 76 is supported to a wiring board or the like on both sides of the holder 76 by using the supporting rods 70 and 78. It is possible to more certainly support the tuning-fork vibration gyro than the structure shown in FIG. 12. The fourth embodiment of the present invention has the same advantages as the first embodiment thereof.

Figure 14:
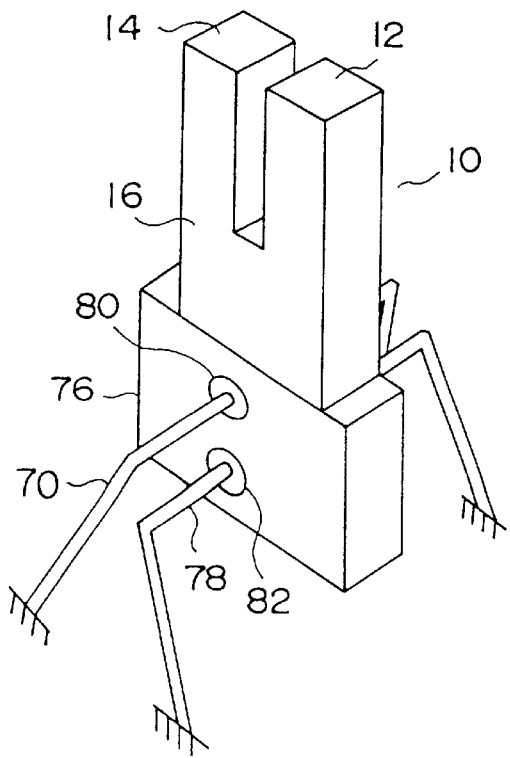
FIG. 14 is a perspective view of a variation of the gyro shown in FIG. 13.

FIG. 14 is a perspective view of a variation of the structure shown in FIG. 13. In FIG. 14, parts that are the same as those shown in FIG. 13 are given the same reference numbers. The structure shown in FIG. 14 is characterized in that the tuning-fork vibration gyro is supported so that it stands upright. In order to provide the upright support, the supporting rods 70 and 78 have bent portions, as shown in FIG. 14. More particularly, the supporting rod 70 is bent at two points at the side of the arm 14, and the supporting rod 78 is bent at two points at the side of the arm 12. By inserting end portions of the supporting rods 70 and 78 into holes formed in a wiring board or the like, it is possible to realize the upright supporting of the tuning-fork vibration gyro.

Figure 15:
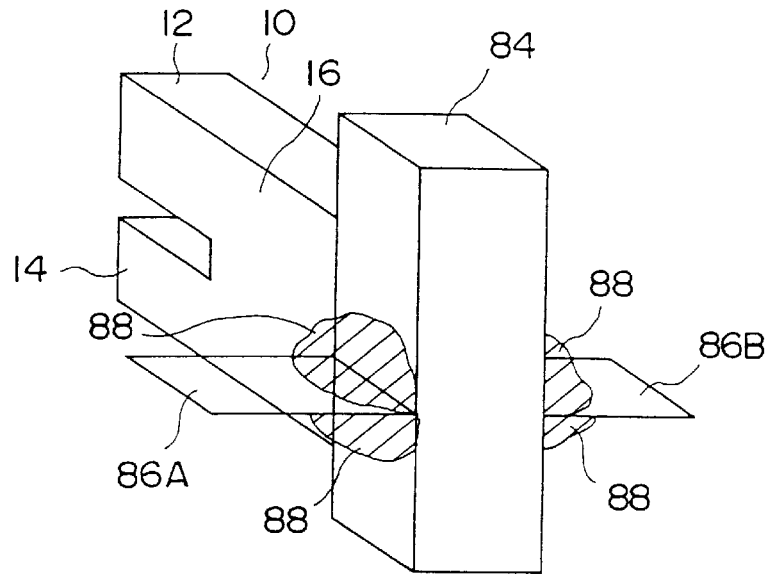
FIG. 15 is a perspective view of a tuning-fork vibration gyro according to a fifth embodiment of the present invention.

FIG. 15 is a perspective view of a fifth embodiment of the present invention. In FIG. 15, parts that are the same as those shown in the previously described figures are given the same reference numbers. A holder 84 used in the structure shown in FIG. 15 does not have any slit and through hole. Supporting plates 86A and 86B stand upright on the opposite side surfaces of the holder 84 and are attached thereto by a resilient adhesive 88. The supporting plates 86A and 86B are located in the center of the rotational motion of the holder 84. The structure shown in FIG. 15 has advantages similar to those of the structure according to the first embodiment of the present invention. In order to reinforce the support of the supporting plates 86A and 86B, it may be possible to form shallow grooves on the opposite surfaces of the holder 84 into which the supporting plates 86A and 86B are fit.

Figure 16:
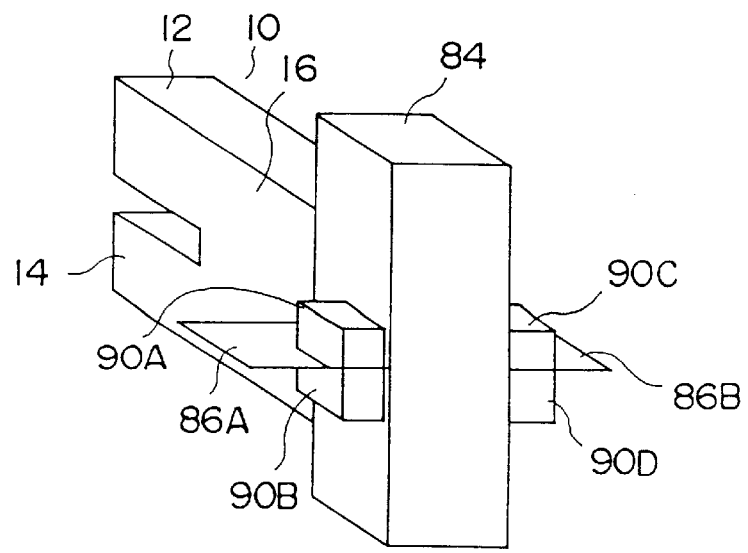
FIG. 16 is a perspective view of a tuning-fork vibration gyro according to a sixth embodiment of the present invention.

FIG. 16 is a perspective view of a sixth embodiment of the present invention. In FIG. 16, parts that are the same as those shown in the previously described figures are given the same reference numbers. In the structure shown in FIG. 16, the supporting plate 86A is supported by sandwiching it between resilient blocks 90A and 90B attached to the surface of the holder 84. Similarly, the supporting plate 86B is supported by sandwiching it between resilient blocks 90C and 90D attached to the opposite surface of the holder 84. The blocks 90A–90D are attached to the surfaces of the holder 84 by a resilient adhesive. The sixth embodiment of the present invention has advantages similar to those of the first embodiment thereof. The resilient blocks 90A–90D are, for example, rubber blocks.

Figure 17:
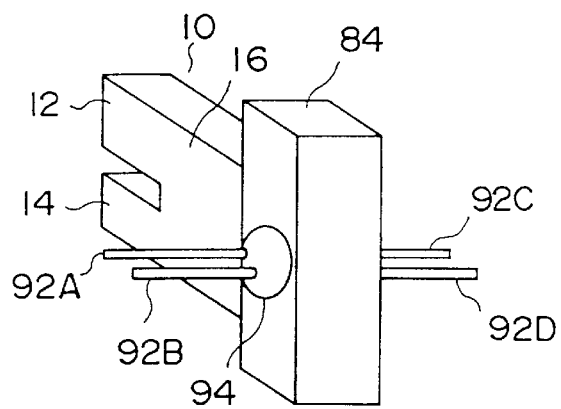
FIG. 17 is a perspective view of a tuning-fork vibration gyro according to a seventh embodiment of the present invention.

FIG. 17 is a perspective view of a seventh embodiment of the present invention. In FIG. 17, parts that are the same as those shown in the previously described figures are given the same reference numbers. Two supporting rods 92A and 92B stand upright on the surface of the holder 84 and are attached thereto by a resilient adhesive 94. Similarly, two supporting rods 92C and 92D stand upright on the opposite surface of the holder 84 and are attached thereto by the resilient adhesive. The supporting rods 92A–92D are located in the center of the rotational motion of the holder 84. The seventh embodiment of the present invention has advantages similar to those of the first embodiment thereof. In order to reinforce the support of the supporting rods 92A–92D, it may be possible to form shallow grooves on the opposite surfaces of the holder 84 into which the supporting rods 92A–92D are fit.

Figure 18:
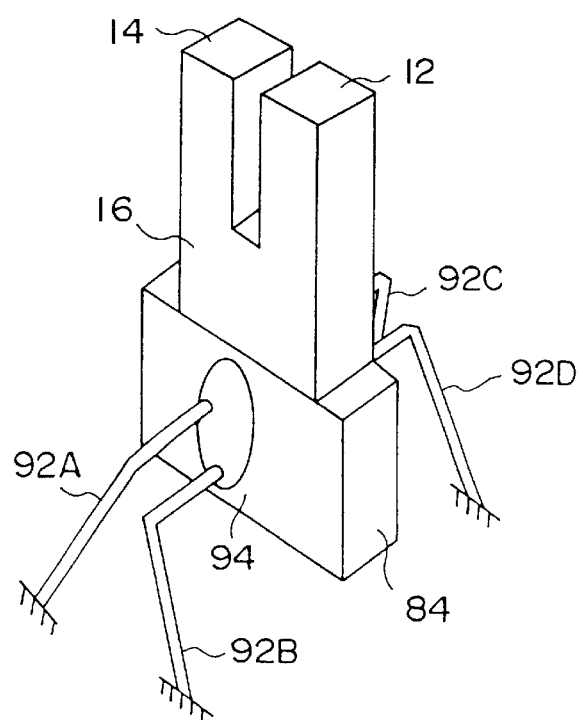
FIG. 18 is a perspective view of a variation of the gyro shown in FIG. 17.

FIG. 18 is a perspective view of a variation of the tuning-fork vibration gyro shown in FIG. 17. In FIG. 18, parts that are the same as those shown in FIG. 17 are given the same reference numbers. The gyro stands upright on a wiring board or the like. In order to realize the upright support of the gyro, the supporting rods 92A–92D are bent so that the supporting rods 92A and 92C are bent at the side of the arm 14 and the supporting rods 92B and 92C are bent at the side of the arm 12. The ends of the supporting rods 92A–92D are inserted into holes formed in the wiring board. In the above manner, the gyro can be mounted on the board so that it stands upright.

Although the electrodes of the second through seventh embodiments of the present invention are omitted, the above electrodes are arranged, as shown in FIG. 5 or FIG. 7.

The present invention is not limited to the specifically disclosed embodiments and variations, and other variations and modifications may be made without departing from the scope of the present invention.

What is claimed is:

1. A tuning-fork vibration gyro comprising:

a tuning-fork vibrator;

a holder attached to the tuning-fork vibrator; and a supporting portion located in a center of a rotational motion of the holder caused by a vibration resulting from a Coriolis force, said supporting portion being attached to said holder by a resilient adhesive;

said supporting portion protruding from two surfaces of the holder opposite each other in a direction in which the vibration resulting from the Coriolis force occurs.

2. The tuning-fork vibration gyro as claimed in claim 1, wherein:

said holder comprises a slit located in the center of the rotational motion thereof; and said supporting portion comprises a supporting plate inserted into said slit, and an adhesive by which the supporting plate is attached to the holder.

3. The tuning-fork vibration gyro as claimed in claim 1, wherein:

said holder comprises a through hole located in the center of the rotational motion thereof; and said supporting portion comprises a supporting rod inserted into said through hole, and an adhesive by which the supporting rod is attached to the holder.

4. The tuning-fork vibration gyro as claimed in claim 1, wherein:

said holder comprises a plurality of through holes located in the center of the rotational motion thereof; and said supporting portion comprises a plurality of rods inserted into said plurality of through holes, and an adhesive by which the plurality of supporting rods are attached to the holder.

5. The tuning-fork vibration gyro as claimed in claim 4, wherein said plurality of through holes are arranged in a line in the center of the rotational motion of the holder.

6. The tuning-fork vibration gyro as claimed in claim 1, wherein said supporting portion comprises:

a plurality of supporting plates attached to two surfaces of the holder; and an adhesive by which the plurality of supporting plates are attached to the two surfaces of the holder.

7. The tuning-fork vibration gyro as claimed in claim 6, wherein said supporting portion comprises supporting members which are provided on the two surfaces of the holder and support the plurality of supporting plates.

8. The tuning-fork vibration gyro as claimed in claim 1, wherein said supporting portion comprises:

a plurality of supporting rods located in the center of the rotational motion of the holder; and an adhesive by which the plurality of supporting rods are attached to the holder.

9. The tuning-fork vibration gyro as claimed in claim 8, wherein at least two of said plurality of supporting rods are provided on each of the two surfaces of the holder.

10. The tuning-fork vibration gyro as claimed in claim 9, wherein said at least two of said plurality of supporting rods are arranged in a line in the center of the rotational motion of the holder.

11. The tuning-fork vibration gyro as claimed in any of claims 1 to 10, wherein said tuning-fork vibrator comprises a base integrally formed with the two arms, and wherein said holder is attached to said base.

12. The tuning-fork vibration gyro as claimed in any of claims 1 to 10, wherein said adhesive comprises a resilient adhesive.

13. The tuning-fork vibration gyro as claimed in claim 1, wherein said holder is formed of a material different from a material of which said tuning-fork vibrator is formed.

14. The tuning-form gyro as claimed in claim 1, wherein the holder is attached to a bottom surface of the tuning-fork vibrator.

* * * * *